United States Patent [19]

Fitts et al.

[11] Patent Number: 4,993,676
[45] Date of Patent: Feb. 19, 1991

[54] APPARATUS FOR SUPPORTING A TELEVISION SET FROM A CEILING

[76] Inventors: William E. Fitts; Christina L. Fitts, both of 375 Chicken Creek Rd., Pulaski, Tenn. 38478

[21] Appl. No.: 465,918

[22] Filed: Jan. 16, 1990

[51] Int. Cl.$^5$ ............................................. A47B 97/00
[52] U.S. Cl. ...................................... 248/317; 52/39; 248/340; 248/343; 248/917; 312/7.2; 312/245
[58] Field of Search ............... 248/317, 342, 343, 344, 248/340, 59, 917, 918, 922, 923, 215, 551, 552, 553, 228; 52/39; 312/7.2, 245, 248, 251

[56] References Cited

U.S. PATENT DOCUMENTS

| | | | |
|---|---|---|---|
| 2,347,113 | 4/1944 | King | 248/343 X |
| 2,632,620 | 3/1953 | Hurley | 248/343 |
| 2,872,006 | 2/1959 | Payne, Sr. et al. | 248/551 X |
| 3,595,513 | 7/1971 | Rehlaender | 248/188.2 X |
| 3,731,760 | 5/1973 | Hammes | 248/553 X |
| 4,645,158 | 2/1987 | Manning | 248/343 |
| 4,657,249 | 4/1987 | Offutt | 248/215 X |
| 4,827,439 | 5/1989 | Licht | 312/7.2 X |

FOREIGN PATENT DOCUMENTS 2617328 11/1976 Fed. Rep. of Germany .......... 52/39
1151400 5/1969 United Kingdom ................ 248/343

Primary Examiner—David L. Talbott
Attorney, Agent, or Firm—Phillips & Beumer

[57] ABSTRACT

Apparatus for mounting a television set or the like from an ordinary home ceiling that has spaced-apart joists such as two-by-fours placed on edge and a ceiling panel secured to the underside of the joints. The apparatus includes an L-shaped bracket and a hollow shaft connected to one of the legs of the bracket so as to form a U-shaped hook that is engageable in flush contact with a ceiling joist. The shaft extends downward through a hole in the ceiling adjacent to a joist and provides support for a cabinet connected to the shaft. A spacer element is preferably disposed between the cabinet and ceiling, and the cabinet is secured by a disc and nut adjacent to the ceiling and a nut engaging the bottom of the shaft below a support plate connected to the top of the cabinet. Electrical wires and coaxial cables as required are threaded upward through the hollow shaft and are made available for connection to power and signal sources. Special implements for threading the wires and cable and for grasping them from a distance are also disclosed.

9 Claims, 2 Drawing Sheets

APPARATUS FOR SUPPORTING A TELEVISION SET FROM A CEILING

FIELD OF THE INVENTION

This invention relates generally to apparatus for supporting objects from a ceiling and more particularly to apparatus for supporting a television set from a home ceiling and to a method of installing the same.

BACKGROUND OF THE INVENTION

Ceiling-mounted television sets are widely used in hospitals to enable patients to view them while reclining in bed. Supporting structures for mounting television sets from the ceiling of buildings such as hospitals would not be easily adaptable for use in homes and would require special tools and skills beyond those available to ordinary homeowners. A need exists for a simple but safe and reliable ceiling mounting apparatus that may be readily installed by the average homeowner in houses with conventional ceiling structures including ceiling joists such as two-by-fours placed on edge and panels of material such as gypsum board secured to the underside of the joists. In addition to providing necessary support, the apparatus should provide a means for threading wires through the support structure to enable connections to electrical power and signal sources.

Various structures for mounting objects such as fans and lamps from ceilings are disclosed in prior patents. U.S. Pat. No. 4,645,158 shows a ceiling fan mounting apparatus that includes a tubular bar supported at each end by extending over the upper edges of spaced-apart ceiling joists or by being attached to the sides of such joists. The bar in turn supports the fan by means of a hook and an electrical outlet box. A ceiling mounting fluorescent lamp fixture is disclosed in U.S. Pat. No. 2,545,307, the fixture including two U-shaped ceiling supports having horizontally disposed legs. Structure for attachment of the supports to the ceiling joists is not shown in this patent. U.S. Pat. Nos. 2,748,727 and 1,489,474 disclose arrangements including a U-shaped clip attachable by a bolt for securing corrugated sheets to the purlin of a roof. Devices for threading wires through conduits are shown in U.S. Pat. Nos. 4,230,305 and 1,130,775.

SUMMARY OF THE INVENTION

The present invention is directed to an apparatus for mounting a television set or similar object from a ceiling that has rectangular, spaced-apart joists supporting a ceiling panel on the underside of the joists. The apparatus includes an L-shaped bracket having an aperture in its horizontally extending top leg for receiving a hollow shaft. The top leg and a vertically extending side leg of the bracket are adapted to come into flush contact with the top edge of one side edge of a ceiling joist. A hollow shaft securable to and supported by the bracket is disposed to extend downward through an aperture in the ceiling and come in contact with the other side edge of the joist. The shaft below its juncture with the ceiling aperture is securable in place by means of a threadably connected nut with a wide disc or washer being interposed between the nut and the ceiling to provide maximum stability and to cover up the hole required to insert the hook. The lower end of the shaft is secured to a cabinet adapted to receive a television set, the shaft end preferably extending through an aperture in a plate on the top side of the cabinet and having threads for engagement by a nut. A spacer such as a cylindrical spool-like element may be disposed between the cabinet and the ceiling to provide an improved appearance. The hollow shaft receives required electrical wires and co-axial cables or the like for coupling to power or cable sources. A threading member for guiding the wires and cables through a conduit is provided, along with a hook enabling them to be pulled across the top of a ceiling from a distance.

This apparatus provides a strong and secure support for use in connection with conventional home ceilings, and installation may be carried out with minimum tools and skills. Installation of the support apparatus is further facilitated by the wire-threading tools and techniques included in the invention.

It is therefore an object of the invention to provide an apparatus for mounting a cabinet from a ceiling having spaced-apart ceiling joists and a ceiling panel secured to the underside thereof.

Another object is to provide such apparatus that may be readily installed by a relatively unskilled workman equipped with a minimum of tools.

Another object is to provide apparatus for mounting a television set to a ceiling wherein the television set may be tilted and rotated to facilitate viewing.

Another object is to provide apparatus that enables wires and cables to be threaded through a supporting conduit and to be grasped from a distance.

Other objects and advantages of the invention will be apparent from the following detailed description and claims.

DESCRIPTION OF THE PREFERRED EMBODIMENT

Figure 1:
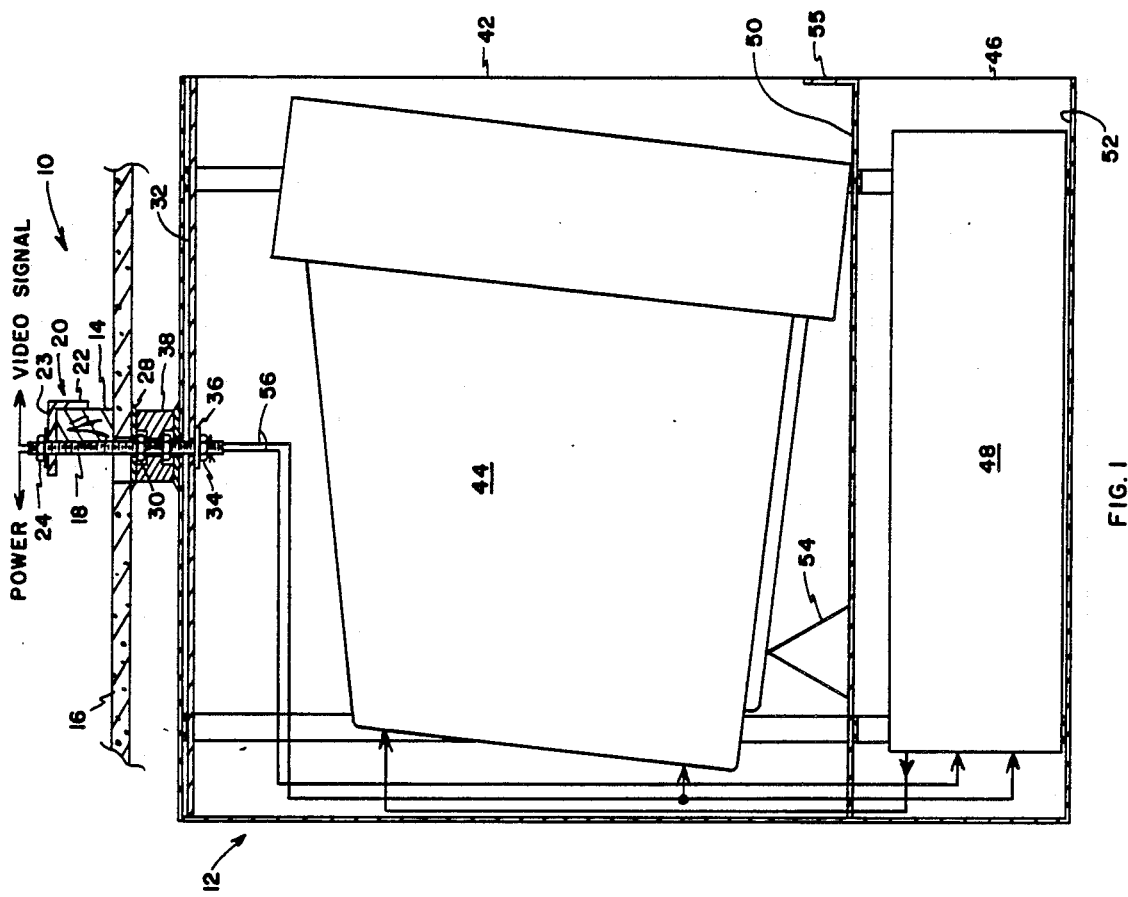
FIG. 1 is a planar cut-away side view of apparatus embodying the invention.

Referring to FIG. 1 of the drawings, there is shown apparatus 10 for supporting a cabinet 12 from a ceiling joist 14 of a conventional home-type ceiling in which a ceiling panel 16 of material such as gypsum board is secured to the underside of joists such as two-by-fours placed edgewise. The supported apparatus includes a hollow shaft or conduit 18 which serves to support the weight of the cabinet and to provide access for necessary electrical wires and coaxial cables. The shaft at its upper end is connected to an L-shaped bar 20 having a leg 22 that extends downward, forming with the side of the shaft and the top leg 23 of the bracket a hook that firmly grasps the ceiling joist. Preferably, the bar has flat surfaces that engage the top and side surfaces of the joists in flush contact to provide stable support. Connection of the shaft to the bar may be made by providing an aperture 25 in the top leg of the bar and by threadable attachment of a nut 24 to external threads on the shaft. The shaft may also be secured to the bar by welding. The shaft 18, placed so that the upper part of its length is in contact with a vertically extending side of a joist 14, projects downward through a hole 26 in the ceiling panel. A wide disc or washer 28 is disposed over the shaft against the bottom of the ceiling panel to distribute lateral forces to which the shaft might be subjected and to prevent the hole from being gouged out.

A second nut 30 threadably connected to shaft 18 may be used to firmly secure the shaft and bar in place, the nut being tightened against washer 28.

Cabinet 12 has a sturdy plate 32 extending horizontally and secured to the inside of the cabinet so as to support its weight. Shaft 18 extends downward inside the cabinet through an aperture in the cabinet and plate. Connection of the cabinet to the shaft is provided by nut 34 threadably attached to the shaft. A washer 36 may be disposed between the nut and plate 32 of the cabinet. A cotter pin 35 is inserted through the shaft below the nut 32 to retain the apparatus in position.

In the embodiment shown, a spacer 38, which may take the form of a cylinder having generally flat upper and lower faces, is disposed between the top of the cabinet and washer 28. The spacer may be used to provide improved appearance and to prevent marring of the ceiling by the cabinet. A recess 40 is provided in the top of the spacer to receive nut 30 therein. The bottom of the spacer has a recess 43 for receiving a nut 41 which further retains the spacer in place during installation.

Cabinet 12 has a rectangular box-like configuration with an upper section 42 adapted to receive and support a television set 44 and a lower section 46 for receiving and supporting a video cassette recorder 48. A shelf 50 is disposed between the cabinet sections to support the television set, and the bottom 52 supports the VCR. Adjustment of the angular location of the screen of the television set downward from vertical may be provided for by means of a slidable shim 54 disposed to prop up the rear of the set, the shim being movable to adjust the screen angle to an optimum location for viewing. A ledge 55 at the front end of the cabinet keeps the tilted television set from sliding out. The cabinet may also be rotated around the axis of the shaft against washer 36 to adjust its location so that the front of the cabinet points in an optimum direction for viewing. Wires 56 and coaxial cables as needed for operation of the television set extend upward from the cabinet through the hollow shaft for connection to necessary power and signal sources.

Figure 2:
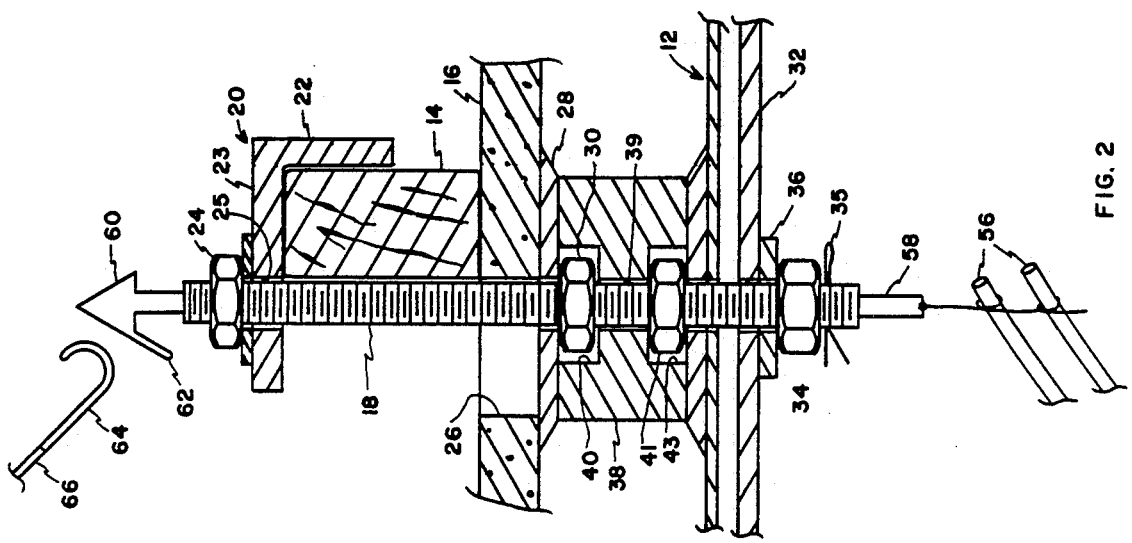
FIG. 2 is an enlarged planar cut-away view showing details of the ceiling mounted support structure.
Figure 3:
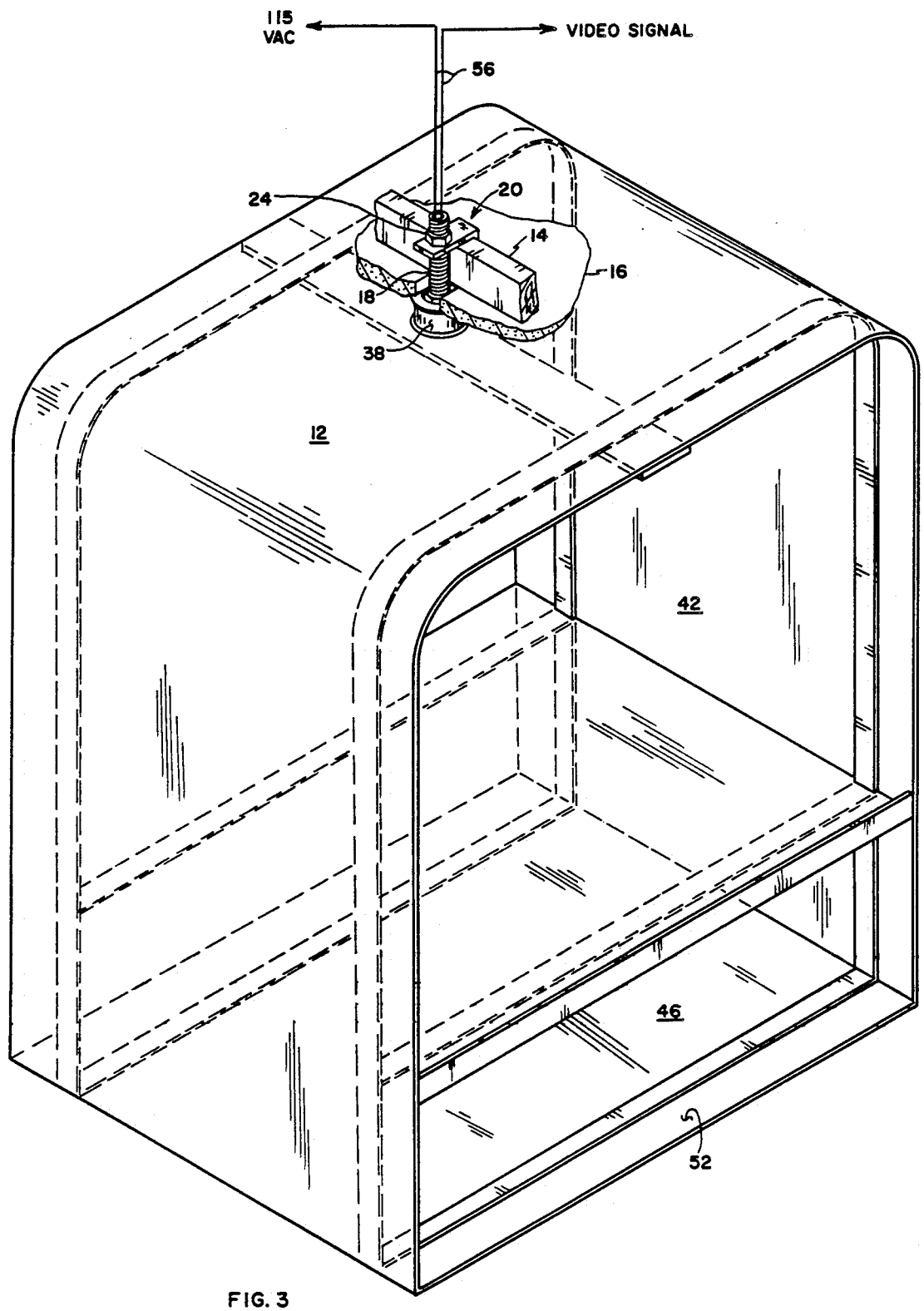
FIG. 3 is a pictorial, partly cut-away, view thereof.

As shown in FIG. 2, wires 56 may be inserted and passed through the hollow shaft 18 by means of a pointed guide rod 58 to the bottom of which the wires are attached by means such as a cord or tape. The guide rod at its upper end has a pointed tip 60 facilitating movement through the shaft and a flexible arm 62 that projects outward when the tip has passed out the top end of the shaft. The projecting arm may then be grasped from a distance by means of a hook 64 for pulling the wires across a ceiling without requiring the installer to walk or crawl over the same. The handle of the hook may be made up of a plurality of rod segments 66 that are threadably connectable to one another.

Installation of the apparatus may be carried out by first selecting a desired place for the cabinet and locating a ceiling joist in that area. A hole is then cut in the ceiling adjacent to the joist big enough to allow the top of the shaft and attached L-shaped bracket to be passed through and hooked around the joist as shown. A wide disc or washer big enough to cover and extend past the hole is then placed in position, and a nut is tightened under the shaft. The spacing cylinder may then be placed over the shaft and secured by tightening a nut at the bottom of the spacer. Wires and coaxial cables are then threaded through the shaft and pulled to a desired location using the pointed guide and hook as described above, and the cabinet is secured by tightening a nut at the lower end of the shaft below the plate as shown.

While the invention is described above in terms of a specific embodiment, it is not to be understood as so limited, but is limited only as indicated by the appended claims. In particular, the cabinet may be modified to include space for other items such as stereo sets or components thereof.

We claim:

1. Apparatus for mounting a television set or the like from a ceiling that includes spaced-apart joists having a rectangular cross section with a ceiling panel secured to the underside of said joists which comprises:
   an L-shaped bracket member having a top leg and a side leg;
   a hollow shaft securable to the top leg in perpendicular relation thereto, said legs and said shaft forming a U-shaped hook adapted to come into flush contact with top and side surfaces of a said joist;
   a bottom portion of said shaft being adapted to extend downward through a hole in said ceiling;
   a cabinet for supporting a television set or the like coupled to said bottom portion of said shaft; and
   means securing said cabinet to said shaft.

2. Apparatus as defined in claim 1 wherein said top leg has an aperture for receiving said shaft, said shaft extends through said aperture and is secured to said leg by a first nut threadably connected to the top region of the shaft.

3. Apparatus as defined in claim 2 wherein said means for securing said cabinet to said shaft comprises a horizontally disposed support plate connected to said cabinet and having an aperture for receiving said shaft and a second nut threadably connected to said shaft and disposed underneath said support plate.

4. Apparatus as defined in claim 3 including a spacer disposed between said cabinet and said ceiling.

5. Apparatus as defined in claim 4 including a disc covering said hole in the ceiling and disposed against said ceiling.

6. Apparatus as defined in claim 5 including a third nut threadably connected to said shaft and urging said disc upward against said ceiling.

7. Apparatus as defined in claim 6 wherein said spacer is generally cylindrical and includes an axially extending aperture for receiving said shaft and a recess in its top surface for receiving said third nut.

8. Apparatus as defined in claim 7 wherein said cabinet includes a horizontal shelf for supporting a TV set and a movable shim member for elevating the back of said set to tilt the set to a desired angle for viewing.

9. Apparatus for mounting a television set or the like from a ceiling that includes spaced-apart joists having a rectangular cross section with a ceiling panel secured to the underside of said joists which comprises:
   an L-shaped bracket member having a top leg and a side leg;
   a hollow shaft securable to the top leg in perpendicular relation thereto, said legs and said shaft forming a U-shaped hook adapted to come into flush contact with top and side surfaces of a said joist;
   said U-shaped hook being connectable to said joist by insertion through a hole in the ceiling from a location below the ceiling;
   a bottom portion of said shaft being adapted to extend downward through said hole in said ceiling;
   a cabinet for supporting a television set or the like coupled to said bottom portion of said shaft; and
   means securing said cabinet to said shaft.

* * * * *